(12) United States Patent
Peelen et al.

(10) Patent No.: US 10,834,191 B2
(45) Date of Patent: Nov. 10, 2020

(54) COLLABORATION DATA PROXY SYSTEM IN CLOUD COMPUTING PLATFORMS

(71) Applicant: MICROSOFT TECHNOLOGY LICENSING, LLC, Redmond, WA (US)

(72) Inventors: Nicolaas Deodorus Peelen, Shanghai (CN); Wang Hui, Shanghai (CN); Jun Tang, Sammamish, WA (US); Sridhar Srinivasan, Shanghai (CN); Mingqiang Xu, Shanghai (CN); Yan Huang, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 15/898,105

(22) Filed: Feb. 15, 2018

(65) Prior Publication Data
US 2018/0176304 A1 Jun. 21, 2018

Related U.S. Application Data

(63) Continuation of application No. 14/680,757, filed on Apr. 7, 2015, now Pat. No. 9,906,597.

(51) Int. Cl.
*H04L 29/08* (2006.01)
*H04L 12/801* (2013.01)

(52) U.S. Cl.
CPC ......... *H04L 67/1097* (2013.01); *H04L 47/12* (2013.01); *H04L 67/06* (2013.01); *H04L 67/104* (2013.01); *H04L 67/1095* (2013.01); *H04L 67/28* (2013.01)

(58) Field of Classification Search
CPC .................................................. H04N 21/632
See application file for complete search history.

(56) References Cited

U.S. PATENT DOCUMENTS

| | | | | |
|---|---|---|---|---|
| 7,523,505 B2 * | 4/2009 | Menschik | ............. | G16H 10/60 726/26 |
| 2003/0126376 A1 * | 7/2003 | Blankenship | ....... | G06F 12/0835 711/146 |
| 2004/0122966 A1 * | 6/2004 | Hum | ................... | G06F 12/0826 709/232 |

(Continued)

*Primary Examiner* — Barbara B Anyan
(74) *Attorney, Agent, or Firm* — Shook, Hardy & Bacon, LLP

(57) ABSTRACT

In various embodiments, methods and systems for enhanced access to storage data based on a collaboration data proxy system are provided. A plurality of metadata tables on one or more peer nodes are referenced for data corresponding to a data request of a requesting node. The metadata tables indicate availability of chunks of data in the one or more peer nodes. A determination is made that the data corresponding to the data request is downloadable from the one or more node; the determination is based on the metadata tables. A download operation configuration instance is generated for a data request of a requesting node. The download operation configuration instance comprises configuration settings for downloading data corresponding to the data request from the one or more peer nodes. The chunk of data is downloaded from the corresponding one or more peer nodes where the chunk is located, using the configuration settings.

20 Claims, 9 Drawing Sheets

(56) References Cited

U.S. PATENT DOCUMENTS

| | | | |
|---|---|---|---|
| 2010/0293228 A1* | 11/2010 | Chaintreau | H04L 67/1095 709/204 |
| 2011/0099218 A1* | 4/2011 | Schwartz | H04N 7/24 709/201 |
| 2017/0085464 A1* | 3/2017 | Khakpour | H04L 45/28 |

* cited by examiner

COLLABORATION DATA PROXY SYSTEM IN CLOUD COMPUTING PLATFORMS

CROSS-REFERENCE TO RELATED APPLICATIONS

This application is a continuation of U.S. patent application Ser. No. 14/680,757, filed Apr. 7, 2015, now U.S. Pat. No. 9,906,597, and entitled "Collaboration Data Proxy System in Cloud Computing Platforms," the entire contents of which are hereby incorporated in its entirety.

BACKGROUND

Cloud computing platforms may offer building, deployment and management functionality for different types of applications and services. In this regard, cloud computing platforms may store large amounts of data for processing to implement the applications and services. In operation, several different clients devices utilizing the application and services can request the same file or portions of the same file simultaneously. Cloud computing platforms can implement limitations to access the file for load balancing and other resource allocation purposes. As such, client devices may have to wait or receive exceptions errors for their requests because the cloud storage platform imposes limitations on access to the file.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for enhanced access to storage data based on a collaboration data proxy system are provided. A plurality of metadata tables on one or more peer nodes are referenced for data corresponding to a data request of a requesting node. The metadata tables indicate availability of chunks of data in the one or more peer nodes. A determination is made that the data corresponding to the data request is downloadable from the one or more node; the determination is based on the metadata tables. A download operation configuration instance is generated for a data request of a requesting node. The download operation configuration instance comprises configuration settings for downloading data corresponding to the data request from the one or more peer nodes. The chunk of data is downloaded from the corresponding one or more peer nodes, where the chunk is located, using the configuration settings. A download operation for the data can further be executed based on a long-tail mitigation routine comprising at least one of a contention avoidance workflow and an increased download throughput workflow.

BRIEF DESCRIPTION OF THE DRAWINGS

The present invention is described in detail below with reference to the attached drawing figures, wherein.

DETAILED DESCRIPTION

Figure 1:
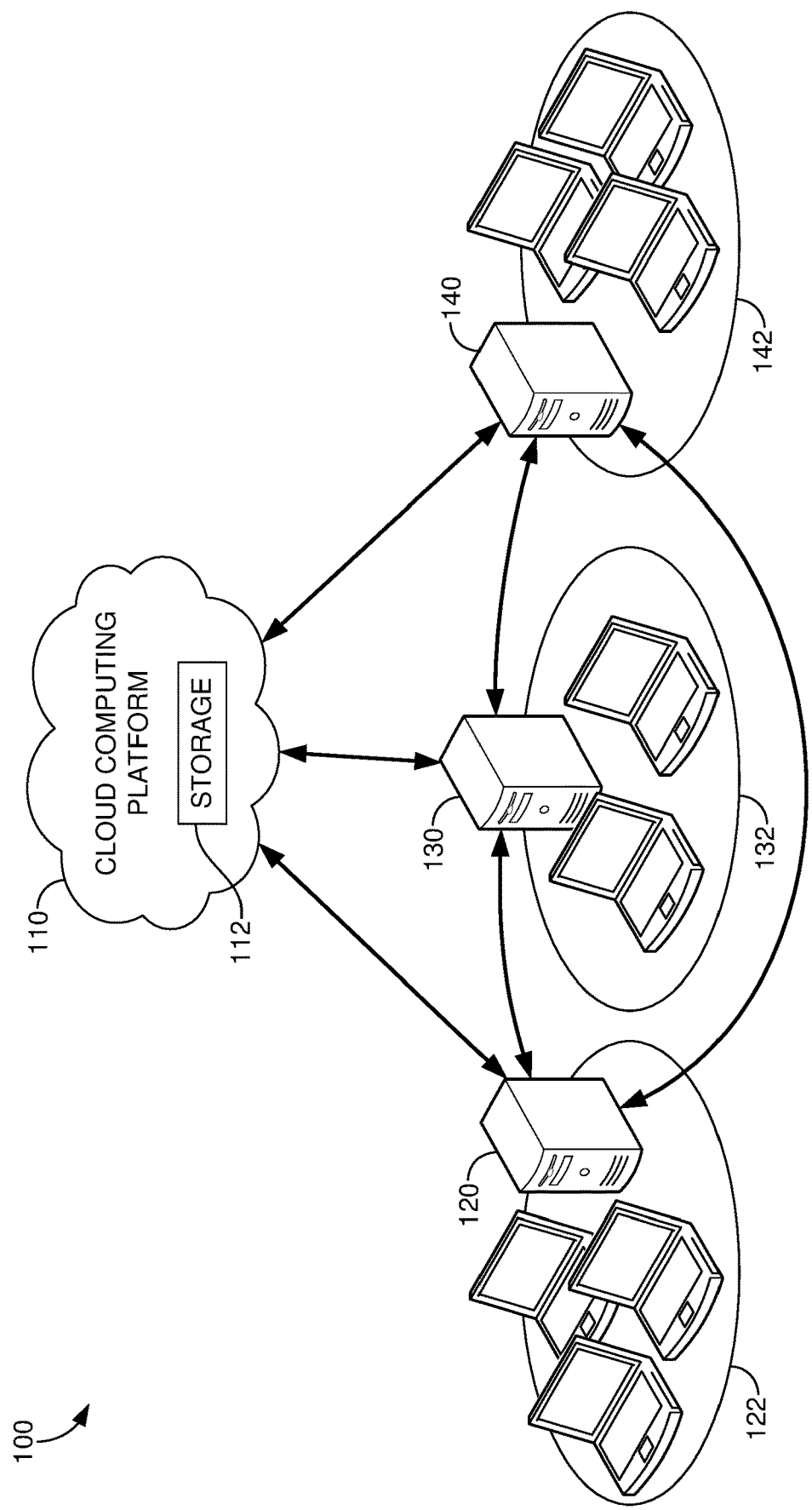
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to a node and client device operating environment supported by a cloud computing platform, the node and client device operating environment includes several peer nodes processing data requests from client devices utilizing applications and services on the cloud computing platform. However, the methods described herein can be performed in different types of operating environments having alternate configurations of the functional components described herein. As such, the embodiments described herein are merely exemplary, and it is contemplated that the techniques may be extended to other implementation contexts.

A distributed storage system can be implemented on a cloud computing platform that runs cloud applications and services across different data center and geographic regions. The cloud computing platform can implement a fabric controller component for provisioning and managing resource allocation, deployment/upgrade, and management of cloud applications and services. Typically, a cloud computing system acts to store data or run applications and services in a distributed manner. The application and service components of the cloud computing platform may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing platforms, multiple servers may be used to run the applications and services to perform data storage operations in a cluster. In particular, the servers may perform data operations independently but exposed as a single device referred to as a cluster. Each server in the cluster may be referred to as a node.

A storage service on the cloud computing platform can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically the location service can allocate location stamps and manage them across the storage stamps for disaster recovery and load balancing.

A cloud computing platform supporting a storage service can support several different clients simultaneously requesting access to the same data (e.g., file or Binary Large Object (BLOB)) or portions of the same data (e.g., a chunk of data). Storage services can limit access to particular data for load balancing and other resource allocation purposes. For example, throughput to a blob in the cloud computing platform storage can be limited to predefined megabits per second (e.g., 60 MB/s). Bandwidth limitations can be specifically associated with a storage account that stores the data to be accessed using a client device. As such, when several different clients attempt to simultaneously access the same data, the clients may have to wait or receive exceptions errors for their requests because the cloud storage platform imposes a bandwidth limit on the data.

Conventional cloud computing platforms may generate multiple copies of the data and store the data in several different locations in the cloud computing platform (e.g., nodes). In this regard, client devices can request the data from any one of the different locations storing the data. Such implementations may mitigate the issue of limited bandwidth to serve several client devices; however, such an implementation lacks the capacity to scale because a determination has to be made on the number of copies of the data that have to be generated and duration for storing the data at the alternate locations. Moreover, conventional methods also do not include flexibility in downloading the data in the peer nodes because download operations are performed without regard to specific customer requirements or the download operations lack the capacity to seamlessly adapt to specific customer requirements without code changes on the cloud computing platform.

Embodiments of the present invention provide simple an efficient methods and systems for providing enhanced access to data based on a collaboration data proxy system using metadata tables. The collaboration data proxy system provides access to data based on a global cache proxy framework that can be scaled using in-memory metadata tables. In particular, a collaboration data proxy service ("proxy service") can implement metadata tables on nodes to manage data (e.g., files or blobs) as a plurality of data duplicates and store the data duplicates in different duplicate storage locations (e.g., peer nodes). In this regard, a client device via a client node (e.g., requesting node) can access the data using any of the plurality of data duplicates at the duplicate storage locations. Implementing a plurality of data duplicates in duplicate storage locations can mitigate access limitations (e.g., wait times and exceptions) associated with simultaneous access to storage data.

Embodiments described herein utilize a global cache proxy framework support enhanced access to data. A client node can access data from a cloud computing platform (e.g., via a storage service) in a more efficient way using the global cache proxy framework. The global cache framework can also be implemented as a flexible topology configuration. The flexible topology scheme adapts to specific business scenarios without need for coding changes in the global cache proxy framework. The global cache proxy framework can include a configurable cache strategy that operates as a Mostly Global Available (MGA) cache that increases cache efficiency. Embodiments described herein further include dynamic download strategies to address long tail issues associated with traditional peer download mechanisms. It is contemplated that the global cache proxy framework can operate as a plug and play implementation that can be functional with different types of cloud computing platform storage services.

A global cache proxy framework can be described by way of example, at a high level. In an exemplary embodiment, a customer account can be associated with a plurality of nodes (e.g., N1, N2, N3 . . . Nk) that are requesting access to the same data (e.g., blob or a file) in storage in the cloud computing platform. A node can be a worker role instance, a virtual machine, or a standalone computing device instance in a cloud computing platform implementation as described in more detail herein. Embodiments herein can be implemented based on an inter-communication prerequisite (e.g., an established communication channel) between the plurality of nodes. In other words, the nodes should be able to directly communicate with each other and the plurality of nodes should have network connectivity to the storage service on the cloud computing platform.

The global cache proxy framework may implement a global read-only cache proxy using the cloud computing platform. As such, when the plurality of nodes request data from a specific data location, the requests can be served using duplicate storage locations (e.g., peer nodes) that already have the data or chunk of the data, where the chunk represents a portion of the data. In this regard, the peer nodes each operate as data cache proxies, such that, if a peer node has a duplicate of the requested data already downloaded, the node would download the data from the peer node. It is contemplated that a request for data would go to the cloud computing platform storage when the peer nodes do not have the requested source data already downloaded. Data in the peers nodes and cloud computing platform that are part of the proxy service can be specifically identified for caching in the collaboration data proxy system. It is contemplated that some data transferred in the cloud computing platform system can be excluded from the collaboration data proxy system based on a designation associated with the data.

Retrieving the data from a peer node having the data stored in a data cache proxy improves on accessibility of cloud computing data. For example, a client device would experience reduced latency and improved throughput as in most cases the amount of bandwidth available among the nodes can be higher than bandwidth available through the cloud computing platform. Further, the cloud computing platform storage service can experience a reduced volume of concurrent transaction requests that improves on the operation of cloud computing platform.

Accordingly, in a first embodiment described herein, a system for providing enhanced access to data in distributed storage systems is provided. The system includes a collaboration data proxy component configured for determining whether data corresponding to a data request of a requesting node is downloadable from one or more peer nodes, and downloading a chunk of the data from the one or more peer nodes, when the chunk is located on the one or more peer nodes. Downloading the data is based on a long-tail mitigation routine. The system further includes a long-tail mitigation component configured for: executing the long tail mitigation routine that facilitates downloading the chunk of data based on at least one of: a contention avoidance workflow and an increased download throughput workflow, where the contention avoidance workflow or the increased download throughput workflow adjust download attributes of a download operation for the data. Download attributes refer dynamically configurable characteristics specific to the download operation that are adjustable to implement a particular download strategy.

In a second embodiment described herein, one or more computer storage media having computer-executable instructions embodied thereon that, when executed, by one or more processors, causes the one or more processors to perform a method for enhanced access to data in distributed storage systems are provided. The method includes referencing metadata tables corresponding to the one or more peer nodes for data corresponding to a data request. The metadata tables indicate availability of chunks of data in the one or more peer nodes. The method also includes determining that the data corresponding to data request is downloadable from the one or more peer nodes. The determination is based on the metadata tables. The method further includes generating a download operation configuration instance for the data request, the download operation instance comprises configuration settings for downloading data corresponding to the data request. The method includes downloading a chunk of the data from the one or more peer nodes using the configuration settings of the download operation configuration instance.

In a third embodiment described herein, a computer-implemented method for enhanced access to data in distributed storage systems is provided. The method includes determining that a data request, associated with a requesting node, is directed to collaboration data. Collaboration data comprises data that is stored on at least one of: a cloud computing platform storage or one or more peer nodes in a collaboration proxy system that has been identified for caching in the collaboration data proxy system. The method also includes referencing metadata tables corresponding to the one or more peer nodes for data corresponding to the data request. Referencing the metadata tables corresponding to the one or more peer nodes is based on an established communication channel with the one or more peer nodes. The method further includes determining that at least a chunk of the data corresponding to data request is downloadable from the one or more peer nodes, where the determination is based on the metadata tables. The method also includes generating a download operation configuration instance for the data request of the requesting node, where the download operation instance comprises configuration settings for downloading data corresponding to the data request from the one or more nodes. The method includes downloading a chunk of the data from the one or more peer nodes using the configuration settings on the download operation configuration instance, where downloading the chunk of data is based on a long-tail mitigation routine.

Referring now to FIG. 1, FIG. 1 illustrates an exemplary collaboration data proxy system ("data proxy system") 100 in which implementations of the present disclosure may be employed. In particular, FIG. 1 shows a high level architecture of collaboration data proxy system ("data proxy system") 100 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, data proxy system 100 includes a cloud computing platform having storage 112, nodes 120, 130, and 140 each service correspond clients computing devices 122, 132, and 142 respectively. Each client computing device resides on any type of computing device, which may correspond to computing device 800 described with reference to FIG. 8, for example. The components of data proxy system 100 may communicate with each other over a network, which may include, without limitation, one or more local area networks (LANs) and/or wide area networks (WANs). Any number of nodes (e.g., servers) and client computing devices may be employed within the data proxy system 100 within the scope of implementations of the present disclosure.

In data proxy system 100 supported by the cloud computing platform 110, the nodes, such as nodes 120, 130, and 140 are utilized to store and provide access to data in the storage of cloud computing platform. The cloud computing platform 210 also may be a public cloud, a private cloud, or a dedicated cloud. The cloud computing platform 210 may include a data center configured to host and support operation of endpoints in a particular service application. The phrase "application" or "service" as used herein broadly refers to any software, or portions of software, that run on top of, or accesses storage locations within, the datacenter. In one embodiment, one or more of the endpoints may represent the portions of software, component programs, or instances of roles that participate in the service application. Also clients 122, 132, and 142 may be configured to provide applications, to access to the data. Client 122 can be linked into an application or a service supported by the cloud computing platform 110.

Having described various aspects of data proxy system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2:
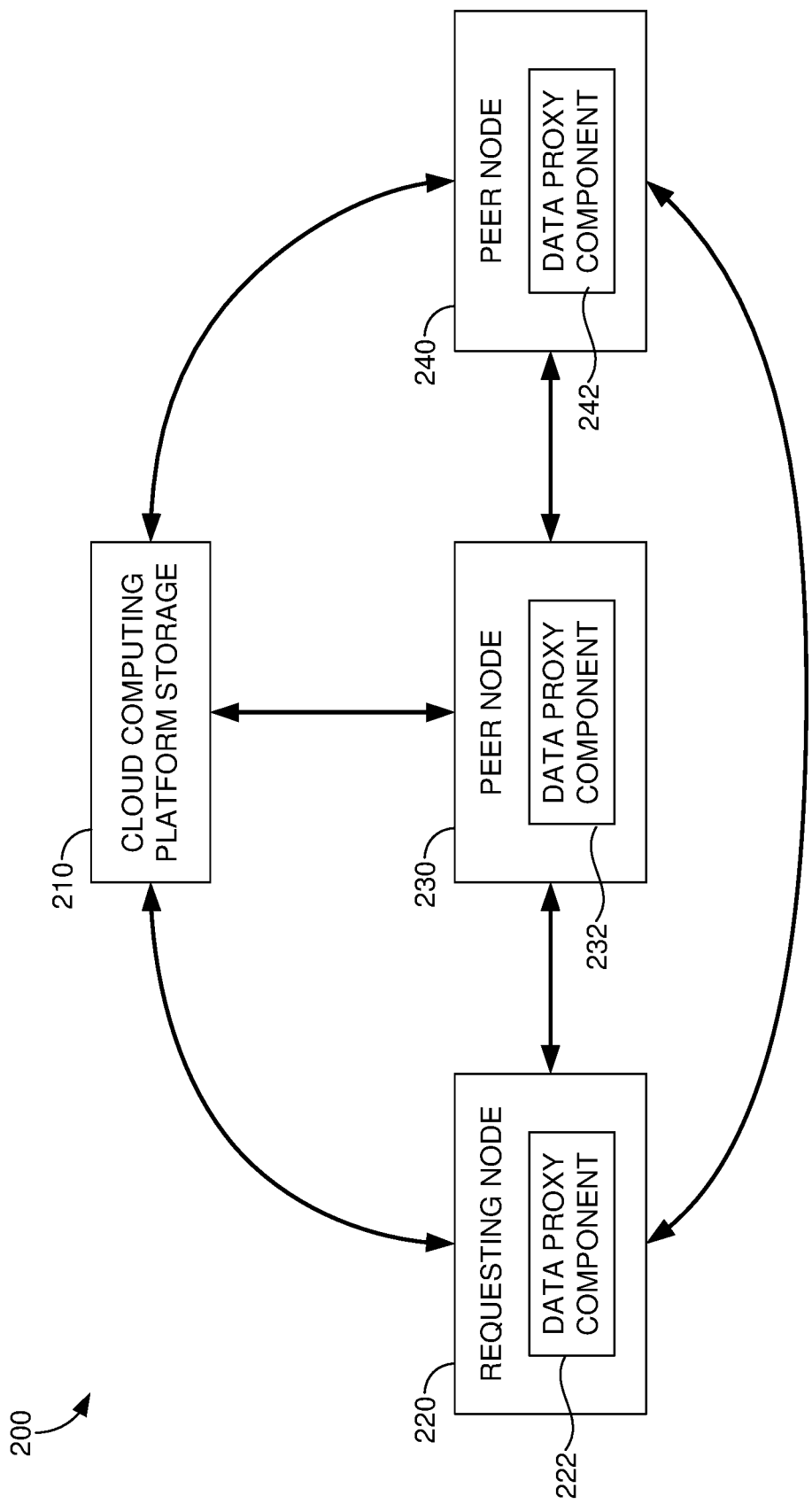
FIG. 2 is a schematic of an exemplary collaboration data proxy system, in accordance with embodiments described herein.

With reference to FIG. 2, FIG. 2 includes the global proxy framework 200 of the proxy system. The global proxy framework 200 and functionality supported therein can be described by way of an exemplary operating environment. The global proxy framework 200 can include a cloud computing platform storage 210, a peer node group having a requesting node 230, and peer nodes 230 and 240. Each node can include several components that facilitate performing the functionality described herein. As shown in FIG. 2, each node includes a data proxy component having a data proxy component 222, 232, 242 respectively.

Figure 3:
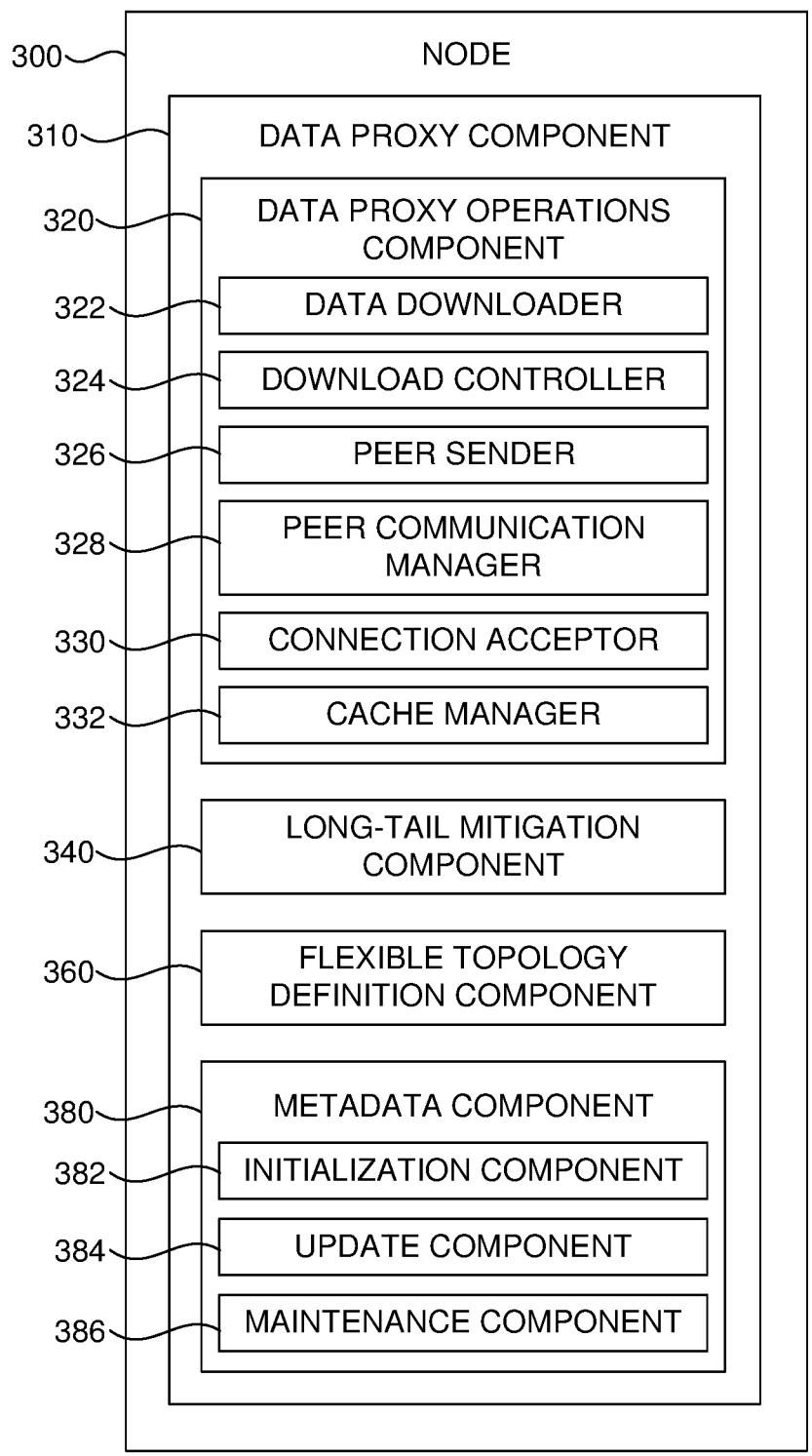
FIG. 3 is a schematic of an exemplary node in a collaboration data proxy system, in accordance with embodiments described herein.

With reference to FIG. 3, FIG. 3 illustrates an exemplary node 300 can include a data proxy component 310 having a data proxy operations component 320, a long-tail mitigation component 340, a flexible topology definition component 360, and a metadata table component 380. The data proxy operations component can further include data downloader 322, a download controller 324, a peer sender 326, a peer communication manager 328, a connection acceptor 330, and a cache manger 332. Other arrangements of components (e.g., machines, interfaces, functions, orders, and groupings of functions, etc.) can be used in addition to or instead of those shown, and some elements may be omitted altogether. The global proxy framework 200 and node 300 are meant to be exemplary and not limiting to the functionality described herein.

In operation, the data proxy component 310 is configured to support the plurality of components identified therein. The data proxy component 310 provides enhanced access to data in a distributed storage system such as a cloud computing platform having a plurality of nodes requesting large amounts of data (e.g., blobs and files). As such, the data can be available in distinct chunks that facilitate communicating and transferring the data from one storage location to another.

The data proxy component 310 is responsible for receiving a data request associated with a requesting node and determining whether the data request from the requesting node is directed to collaboration data. The collaboration data refers to data that is stored in the cloud computing platform storage or one or more peer nodes. The requesting node can request data that is not part of the collaboration data proxy system, for example, data that is external to the cloud computing platform distributed storage (e.g., the cloud computing platform storage or peer nodes), as such, the data proxy component 310 can forward the data request to a data source corresponding to the data request, when the request is not directed to collaboration data. The data proxy component 310 can process the data request based on availability of the data on the cloud computing platform distributed storage when the request is directed to collaboration data.

The data proxy component 310 is further responsible for determining whether data corresponding to a data request of a requesting node is downloadable from one or more peer nodes. Determining that the data is available on peer nodes is based on referencing metadata tables. Metadata tables indicate availability of chunks of data on a corresponding node. Nodes are configured to maintain metadata tables as discussed on more detailed herein. The data proxy component 310 on a node can reference the metadata tables corresponding to peer nodes using an established communication channel with the peer nodes. It is contemplated that a node maintains a metadata table with the most-up-to date information from peer nodes. The information can be communicated between the nodes. The data proxy component 310 downloads a chunk of the data from peer nodes, when the chunk is located on the one or more peer nodes. Downloading the data from the peer node can use a long-tail mitigation routine that is supported by the long-tail mitigation component 340.

The long-tail mitigation component 340 is responsible for supporting a long tail mitigation routine. The long tail mitigation routine can implement dynamic download strategies in the global framework data proxy to resolve long tail issues experienced in traditional peer to peer download mechanisms and improve performance of the data cache proxy system. At a high level, a long tail issue refers to an operation that involves a large number of nodes requesting to download data (e.g., a file or blob) to a local storage associated with the node. In operation, a subset of nodes from the nodes may take a significantly longer period of time to finish the download operation than another subset of nodes that finish the download operation much faster. The larger the size of the data being downloaded the more the discrepancy between the time periods between slower nodes and faster nodes.

By way of example, sufficiently large data sizes for slower nodes can take up to three times longer to download data than the faster nodes. The difference between slower nodes and faster nodes can be attributed to difference or heterogeneity of hardware, speed of local media on which the data is written to, and the distributed nature of the cloud computing platforms. As such, each node independently determines, based on the factors described, how to download data (e.g., data chunks of a blob) and where the data can be retrieved from. The outcome inevitably involves a number of nodes attempting to retrieve the same data from a single source node which eventually causes a bottleneck.

Figure 4:
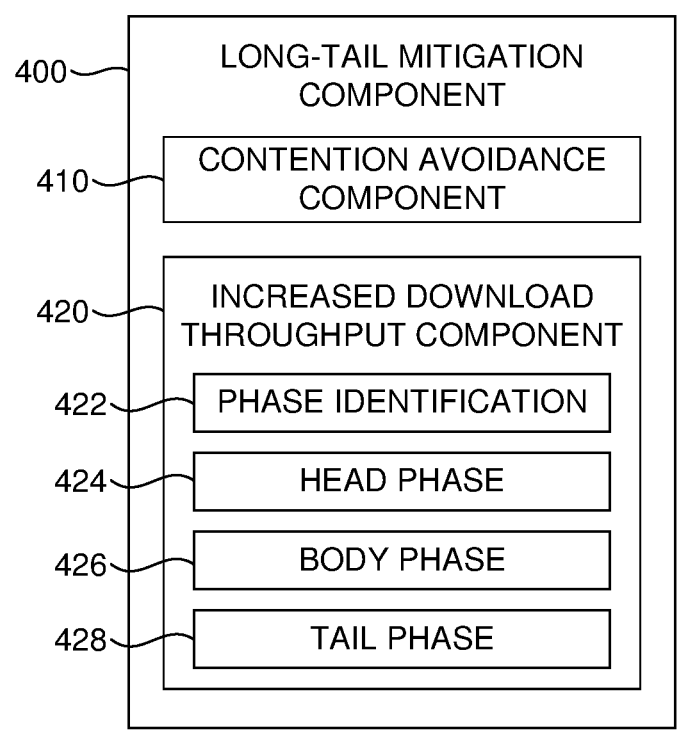
FIG. 4 is a schematic of an exemplary long-tail mitigation component in a collaboration data proxy system, in accordance with embodiments described herein.

With reference to FIG. 4, embodiments described herein utilize the long-tail mitigation component 400 to implement a long tail mitigation routine to reduce or eliminate the effect of the issues described above. Each node can be configured to support the long-tail mitigation routine with each individual long-tail mitigation component 400. The long tail mitigation routine can be implemented using two main workflows: the contention avoidance workflow and the increased download throughput on slow nodes workflow corresponding to a contention avoidance component 410 and an increased download throughput component 420 having phase identification 422, head phase 424, body phase 426 and tail phase 428 modules that support corresponding functionality described herein. The contention avoidance workflow and the increased download throughput workflow can be implemented individually and in combination to adjust download attributes of a download operation corresponding the data.

The contention avoidance workflow refers to avoiding contention based on a chunk selection algorithm. Chunk selection based on the chunk selection algorithm can be altered to have a higher probability of choosing chunks that are not yet being downloaded by other nodes or being downloaded by the fewest number of nodes. By way of example, the algorithm may include reviewing a plurality of chunks being downloaded and the number of peer nodes downloading a particular chunk and selecting a chunk for download based on the lowest number of peer nodes downloading the particular chunk. The chunk selection algorithm can further include implement a download strategy where more network calls are associated with chunks of data having a lower number of concurrent nodes downloading the chunks of data and less network calls are associated with chunks of data having a higher number of concurrent nodes downloading the chunks of data. Other variations and combination of the chunk selection algorithm are contemplated with embodiments described herein.

The increased download throughput workflow refers to employing different downloading strategies during different phases of the downloading. Download phases can include head, body, and tail. Each phase can correspond to a defined percentage of data chunks downloaded. A phase identification scheme facilitates identifying what phase of downloading a particular download operation is currently in. In particular, the phase can be dependent on a number of chunks that have been downloaded to the local requesting node compared to the total chunk size of the requested data. The phase identification scheme can be implemented as a configuration threshold. In embodiments, the configurable threshold can have default values, for example, a head stage can correspond to a head threshold where the downloading process is beginning with about 0%-30% of the data download, the body stage can correspond to a body threshold during a downloading process where about 30%-85% of the data has been downloaded, and the tail stage can correspond to a tail threshold where the downloading process is near the end with about 85% of the data downloaded.

With reference to the head phase, at the start of the download, all nodes can be empty with source data. As such, the nodes can then attempt to retrieve random chunks from the cloud computing platform storage. During the head phase, the nodes can download different chunks of data from the cloud computing platform storage to seed to the data cache proxy system. If it is determined that the nodes receiving the data are being throttled when downloading data from the cloud computing platform storage, a determination can then be made to aggressively back-off or throttle downloading to a defined low rate from the cloud computing platform storage and trigger downloading from peer nodes instead. Throttling downloading can be based on reducing the number of network calls downloading the data from the cloud computing platform storage. Triggering downloading can include generating new network calls to peer nodes for downloading the data.

The head phase can also include the long-tail mitigation component 400 determining that no throttling is occurring at the cloud computing platform storage, for example after a predefined period of time. As such, each node may increase the number of calls to the cloud computing platform storage to download the data. An increase to in the number of network calls can be gradual—over a period of time or immediate—at the same time. An increase can continue until either the node starts being throttled or the node download throughput is no longer increasing when increasing the number of calls to the download the data.

With reference to a body phase, the body phase is based on identifying a predetermined percentage of chunks being seeded on the network. Upon said determination, the implementation can reduce the number of cloud computing platform storage download calls for the data in order to retrieve chunks from peer nodes instead. The body phase as described herein advantageously increases the availability of chunks on the network. The body phase can continue until a predefined percentage of peer nodes have finished download the cloud computing platform storage. It is contemplated that the body phase can be followed by a tail phase.

With reference to the tail phase, during the tail phase a node no longer attempts to download each chunk from a single node but rather downloads the same chunk from a plurality of nodes termed tail phase nodes. It is contemplated that several tail phase node groups can be identified where each tail phase peer node group is used to download the same chunk. In operation, the tail phase comprises selecting a number of tail phase peer nodes from which to download the same chunk. Tail phase peer nodes refer to a number of peer nodes from which a requesting node will download the same chunk of data. As such, a single chunk can be requested from multiple tail phase peer nodes and one tail phase peer node will deliver the requested chunk the fastest. The chunk from the fastest tail phase peer node is processed and the chunks from the other tail phase peer nodes can be discarded. It is contemplated that a request for a chunk from the slower nodes can be affirmatively cancelled upon receipt of the chunk from the fastest node.

With reference to FIG. 3, the flexible topology definition component 360 can support flexible configuration of the functionality supported herein. The flexible configuration scheme adapts to different client device request requirements (e.g., customer scenarios) without necessitating alteration of the code of the global cache framework. For example, configuration settings can be associated with a particular customer, account, or specified attribute (e.g., time of day or location) such that when the customer, account, or specified attribute is identified by the flexible topology definition components, particular configuration settings are configured for downloading request data.

The flexible topology configuration component 360 utilizes a download operation topology schema ("schema") that provides supports the data cache proxy system. The schema can be used to generate a configuration instance that corresponds to download operations that is executed using the configuration settings in the configuration instance. The schema may be applied in several different types of implementations that include a broad schema-based representation of specific aspects of a download operation. The schema (e.g., an XML schema) may define constraints (e.g., physical and logical elements associated with attributes) in the structure and content of the schema that corresponds to a download operation. The constraints can be expressed using grammatical rules governing the order of elements, data types of elements and programmatic definition of attributes, and additional specialized rules as described herein.

The schema can be defined using a download operation topology definition schema template language ("template language"). The template language may be a markup language (e.g., Extensible Markup language—XML) that defines a set of rules for encoding the schema in a human-readable and machine-readable format. The template language may specifically support different template elements that comprise variable placeholders for a plurality of template elements. One or more of the template elements can be used to generate a configuration instance for a download operation. The configuration instance for a download operation in one embodiment may be a simple configuration text file for download operation variable to be defined using template element. It is contemplated that the schema may be represented in a single file as a configuration instance.

Template elements may be predefined in the template and additional template elements may be dynamically populated from the one or more components in the data proxy system. Template elements in the download operation configuration instance may be associated with different features in the template language that facilitate evaluating the template elements to support performing the download operation. A sample download operation configuration instance is reproduced below with different template elements (e.g., collaboration cache proxy configuration settings, collaboration download blobs, blob, storage credentials, and download settings) and corresponding components and their attributes. In this regard, the constraints in the definition of a download operation can facilitate downloading data from peer nodes or the cloud computing platform storage based on the specific constraints or configuration settings defined a configuration instance of a download operation.

It is contemplated that the download operation configuration instance is associated with an account (e.g., customer) such that configuration settings are identified based cloud computing platform requirements defined for that account. For example, service-level agreements associated with the customer account can facilitate defining the configuration settings of configuration instance. For example, data access service level agreement (e.g., data request response times) can implicate the specific configuration settings for an instance.

```
<?xml version="[Value]"encoding="[Value]"?>
<collaborativeCacheProxyConfigSettings version="[Value]">
    <collaborativeDownloadBlobs>
        <blob uri="https://[Path]">
            <storageCredentials mode="[Value]">
                <sharedKeyCredentials keyValue="[Value]"/>
            </storageCredentials>
        </blob>
        <blob uri="https://[Path]">
            <storageCredentials mode="[Value]">
                <sasTokenCredentials token="[Value]" />
            </storageCredentials>
        </blob>
        <blob uri="https://[Path]">
            <storageCredentials mode="Anonymous" />
        </blob>
    </collaborativeDownloadBlobs>
    <downloadSettings
        CacheFilePath="[Path]"
        UseSingleThreadForFileReadAndWrite = "[True or False]"
        MaxMemoryConsumptionByBuffersInChunkSizeUnit = "[Value]"
        SmallBufferSize = "[Value]"
        MaxNumberOfSmallBuffers = "[Number]"
        InMemoryCacheMode =" [Value] "
        ExchangeNodeListAndChunkMapInterval = "[Value]"
        PeerDownloaderSleepPeriod = "[Value]"
        BlobDownloaderSleepPeriod = "[Value]"
        DirectlyDownloadFromBlobThreshHold = "[Value]"
        NumberOfBlobDownloaders = "[Value]"
        MinSelectedPeers = "[Value]"
        MaxSelected Peers = "[Value]"
        SelectPeersRatio = "[Value]"
        PeerSender_ReadTimeout = "[Value]"
        PeerSender_ReconnectLimit = "[Value]"
        TcpConnectionDefaultWriteTimeout = "[Value]"
        PeerReceiver_ReadTimeout = "[Value]"
        ControlService_ReadTimeout = "[Value]"
        PeerCommunicationManager_NumberOfRoundsToEmptyBlockList = "[Value]"
        MaxConcurrentConnectionsForControlService = "[Value]"
        MaxConcurrentConnectionsForP2PServiceMargin = "[Value]"
        ConnectionAcceptor_DelayBeforeAcceptNewClientWhenThrottling "[Value]"
        ValidateMD5AfterDownloadingFromBlob = "[True or False]"
        ValidateMD5AfterDownloadingFromPeers = "[True or False]"
        ValidateFullFileMD5AfterDownloadComplete = "[True or False]"
    />
</collaborativeCachProxyConfigSettings>
```

| Configuration Name | Description |
| --- | --- |
| CacheFilePath | Location to store local cache data. |
| UseSingleThreadForFileReadAndWrite | This setting controls whether to use a single actor for both read and write file. Depending on the type of device used for storing the destination file performance could be improved by using a single thread to do both file read and writes to limit contention. |
| MaxMemoryConsumptionByBuffersInChunkSizeUnit | This setting controls the max memory consumption by large buffers (which are used to read chunks from the network stream or local file) in the unit of a chunk size. |
| SmallBufferSize | This setting controls the size of a small buffer which is used to store metadata communication between peers. |
| InMemoryCacheMode | This setting configures which chunks are cached in memory, default mode is LRU (Least Recent Used). The LRU eviction policy only depends on information of the cache on the local machine, as do a number of other options:<br>LRU (Least Recently Used)<br>For each in memory chunk the data proxy component can keep track of when it was last written or served to a peer node. When the data proxy component need to evicts chunks from the cache it will evict one of the least recently used cache chunks.<br>LFU (Least Frequently Used)<br>For each in memory chunk data proxy component keeps track of how many times it has been accessed (for serving to peers). When the data proxy component needs to evict chunks from the cache the data proxy component will evict those that are served least frequently. |

| Configuration Name | Description |
| --- | --- |
| | FIFO (First In First Out)<br>When the data proxy component needs to evict chunks from the cache the data proxy component will evict them strictly based on the order they have been added to the cache.<br>RR(Random Replacement)<br>When the data proxy component needs to evict chunks from the cache the data proxy component will select a random chunk to be evicted.<br>In addition to the earlier mentioned options the data proxy component can also provide an option that looks at the data available on peers as well:<br>MGA (Most Globally Available)<br>When a chunk needs to be evicted from the cache the data proxy component will evict them based on how many copies of each chunk are available across all peer nodes. |
| ExchangeNodeListAndChunkMapInterval | This setting controls how frequently the node list and chunk map information should be exchanged with our peers. |
| DirectlyDownloadFromBlobThreshHold | This setting controls the blob downloader to only download chunk from blob storage directly if its "AvailableOnNumberOfNodes" property is below this threshold. |
| NumberOfBlobDownloaders | This setting controls how many blob downloaders would be created by the download controller for a single download session which would be used to download chunk directly from the blob. |
| MinSelectedPeers, MaxSelectedPeers, SelectPeersRatio | These three settings control how many peers the peer communication manager will try to connect to. It will try to establish a peer relationship with.<br>K = total nodes.<br>P = Min(MaxSelectedPeers, Max(MinSelectedPeers, (K * SelectPeersRatio))) |
| PeerSender_ReconnectLimit | This setting controls how many times PeerSender will try to reconnect to the remote endpoint continuously (e.g. If a PeerSender failed to connect to the remote endpoint continuously, it will stop itself). |
| PeerCommunicationManager_NumberOfRoundsToEmptyBlockList | This setting controls the PeerCommunication Manager would empty its block list after how many rounds of "DoWork" This means the temp block list would be empty in each (EnsureConnectionToPeersInterval * this value) time. By default it is 10000 milliseconds * 15 = 150 s. |
| MaxConcurrentConnectionsForP2PServiceMargin | This setting controls the margin (difference) between the max concurrent connections for P2P service and the number of peers to select. |
| ConnectionAcceptor_DelayBeforeAcceptNewClientWhenThrottling | This setting controls how much time the ConnectionAcceptor instance would delay before accepting new instances when max concurrent connections limit is reached. |

With continued reference to FIG. 3, the flexible topology configuration component 360 can be implemented using the components in the data proxy operations components 320. Each of the components can perform specific operations to facilitate and adaptable operating environment that support specific client requirements. For example, the data download component 322 can be configured to download data or chunks of data. Data can include a file or a blob or portions thereof in defined chunks. In particular, the data download component 322 can be implemented as a worker thread to download blob chunks from a cloud computing platform storage or a peer node. It is contemplated that a plurality of peer nodes can define a particular download group of peer nodes that operates together.

The download controller 324 can be configured to manage a life cycle of a download. The life cycle of a download for a particular data request can include several defined steps. For example, the peer sender component 328 can provide an actor that makes calls to establish a communication channel and communicate with peer nodes and the cloud computing platform. The peer communication manager 328 can maintain (e.g., clean) the metadata tables, as discussed herein in more detail and facilitate selecting communication peer nodes. Further, the connection acceptor 330 component can accept incoming connections from peer nodes. The download controller 332 can be used by multiple downloaders when downloading multiple targets data items (e.g., files or blobs) concurrently. The cache manager 332 is responsible for caching data based on the download operation configuration instance settings.

With reference to FIG. 3, the metadata component 380 is responsible for managing and implementing a metadata workflow to facilitate functionality of the embodiments described herein. In particular, the metadata component 380 stores and communicates metadata tables in corresponding peer nodes to support scalability in the data cache proxy system. The implementation of metadata tables supports scalability based on efficient communication of peer nodes with each other and the cloud computing platform based on the metadata table on each node.

Figure 5A:
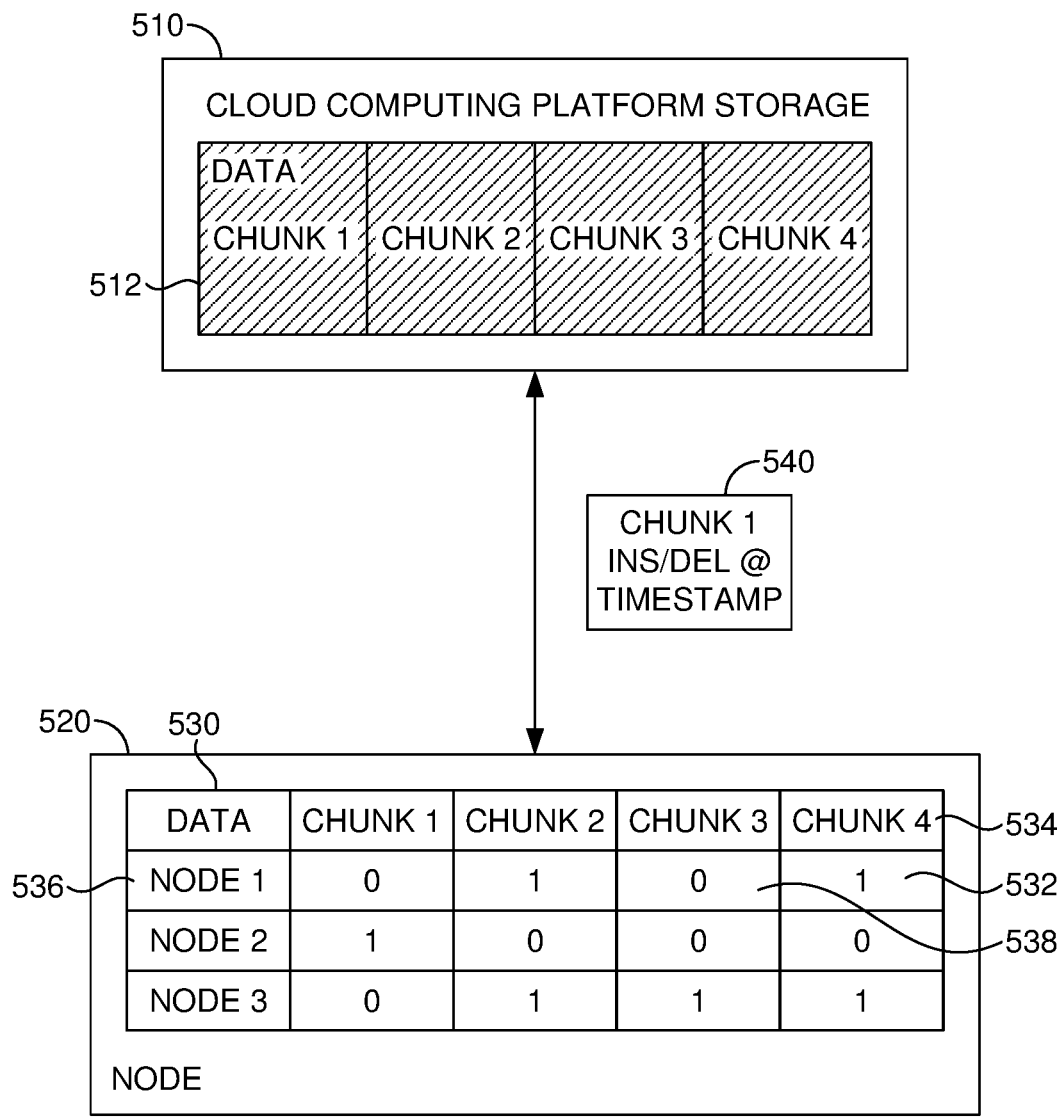
FIGS. 5A and 5B are tables of exemplary metadata entries in a collaboration data proxy system, in accordance with embodiments described herein.

Turning to FIG. 5A, by way of example, a metadata table 530 can be implemented as a 2-dimensional table on a node 520. The metadata table maintains the availability of each data chunk, of the data download 512 (e.g., blob), on every node inside a peer group. The availability data for the data chunks can be maintained in real time. Each cell represents a metadata entry. For cell 532 in the 1st row and 4th column, a designation of 1 can indicate that the corresponding data chunk—chunk 4 534 is cached by node 1 536. The 1 indicates that the data chunk is available to be downloaded from the node. It is contemplated that the designation that a chunk is available is disregards whether the node is busy. 0 538 designates that the data chunk—chunk 3 540 is not available at the node. The metadata component adds a new row to the table when a new peer node is added to the peer group, and also adds a new metadata table for a new download. For example, a metadata table can be associated with an individual blob.

The metadata component 380 is also responsible for managing entries in the metadata table based on chunks (e.g., chunk 1 540) transferred to a node. The metadata entry can be associated several defined fields that define attributes of the metadata entry. By way of example, fields can include a property field (e.g., Download ID, Node ID, Chunk ID, Timestamp, and IsInsertion) corresponding to a type field (Download ID, std::string, uint32_t, unint64_t, and bool), and a description field. The Download ID indicates an identifier for the download, the Node ID indicates an identifier for the node on which the metadata entry originates, the Chunk ID indicates a particular chunk of a plurality of chunks associated with a download, a time stamp indicates a time when the metadata change occurred and an IsInsertion indicate whether the change is an insertion or deletion change. It is contemplated that when a chunk is inserted into the cache or deleted from the cache, a corresponding metadata entry can be generated. The metadata entry can be propagated to peer nodes after a synchronization operation.

A metadata entry refers to a basic data element in a metadata exchange operation. The metadata exchange operation can be performed between two peer nodes communicating metadata corresponding to data stored at the peer node. A timestamp can be attached to each metadata entry. Timestamps can be durable and can also persist across processes. Nodes may use the timestamps to resolve conflicts and discards duplicates on received metadata entries.

Figure 5B:
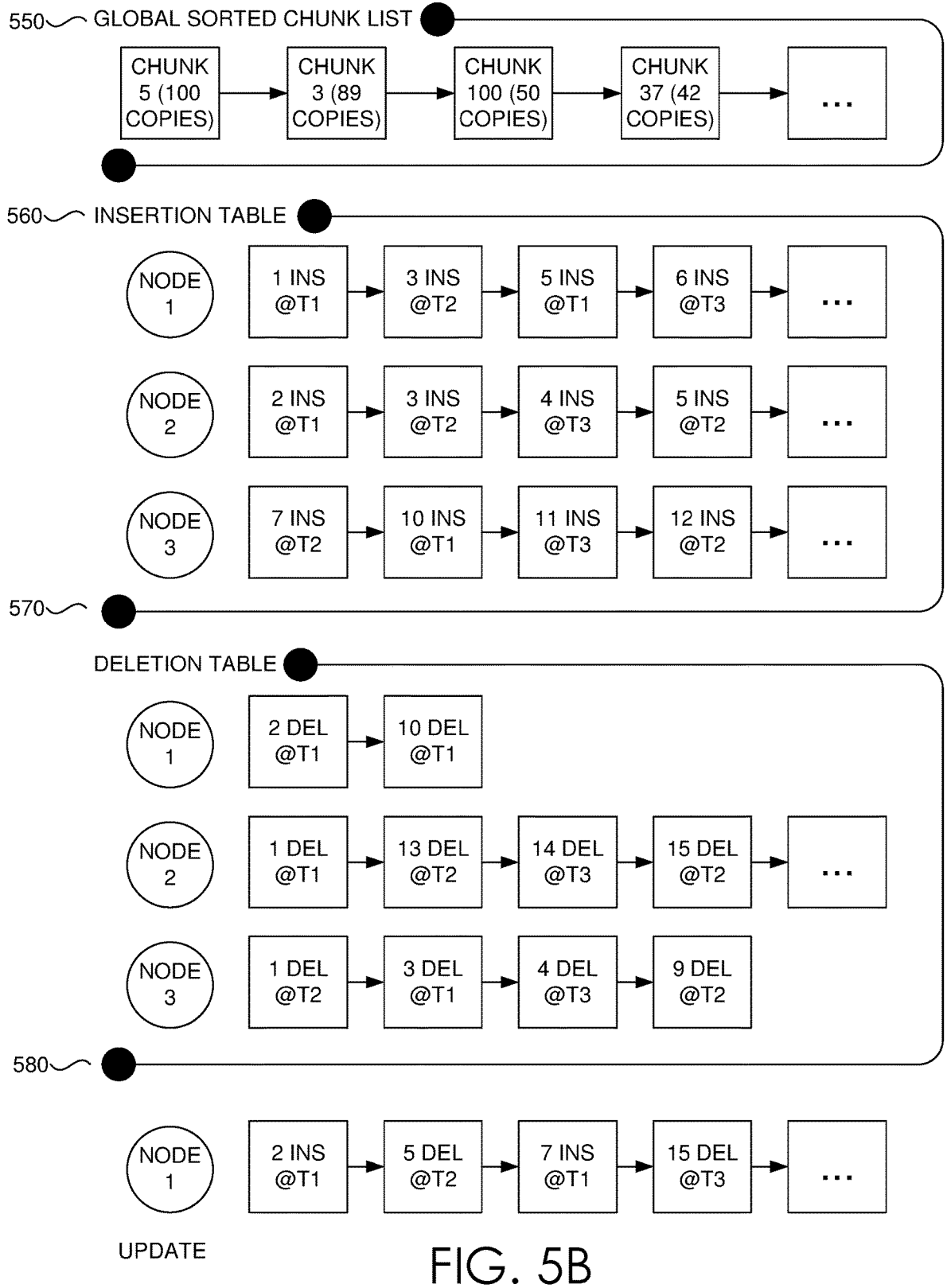

Metadata tables can be maintained in in-memory of a peer node. An in-memory table on each peer node can correspond to each data download. The table can include several portions (e.g., a global sorted chunk list, an insertion table, and a deletion table). Specifically, with reference to FIG. 5B, the table can include a global sorted chunk list 550 that refers to a list that indicates a union of the sets of all the chunks that are downloaded by all nodes. The global sorted chunk can be sorted by the chunk copy count.

The table can further include an insertion table 560 that contains all insertion metadata entries generated by the node itself and peer nodes. The table can reflect the view of all individual cache manager (e.g., cache manager 332) in each peer node as each insertion corresponds to an available chunk that is cached. The table can provide information corresponding to queries from a data downloader (e.g., data downloader 332).

The table also includes a deletion table 570 that preserves deletions in-memory. Maintaining a deletion table facilitates handling metadata conflicts. For example, suppose a chunk was cached by Node 1 at time t1, and then removed later at time t2 where (t1<t2). Now, due to a network delay, the deletion metadata entry may be propagated to Node 2 earlier than the insertion. A deletion table can be used to resolve scenarios such as the one described above as the deletion table can be referenced to reconcile such differences in information. In order to avoid the deletion table from growing unbounded, the table can be stored using a first-in-first-out cache mechanism. Upon meeting a predefined threshold, new insertions in the deletion table can cause a deletion record to be removed from the table.

The metadata component 380 is responsible for determining whether a received chunk of data at the node is applicable, or in other words, is a chunk that is tracked for the data proxy system. When the data chunk is applicable, the metadata component applies a corresponding metadata entry into the metadata table and updates the global stored chunk list.

An initialization component 382 is responsible for managing a life cycle of the metadata recorded for data downloads. Specifically, the metadata component 380 performs an initialization operation to build a metadata entry table for a corresponding node. The initialization operation includes retrieving tables from peer nodes when the node joins the collaboration data proxy network. Initialization operations can be performed during startup of a node or on failovers. An initialization operation can include specific actions for building the metadata entry table. Actions can include pulling metadata entry table from one or more selected peer nodes. It is contemplated that a metadata entry table in individual node can differ due to latency in the collaboration data proxy network. The pulled metadata entry tables can be in the form of batched updates. The metadata component can merge all the updates and apply them to the in-memory table. Initializing can further include a cache manager that detects pre-cached chunks and notifying the metadata component 380 about their existence. The metadata component 380 needs to send out all metadata entries when a particular node is a brand new node from existing nodes point of view.

An update component 384 can be responsible for managing updates communicated between the nodes. Nodes send updates (e.g., update 580) between each other to communicate metadata entries. Metadata entries can originate from the node itself. Metadata entries in one update can have different timestamps and types (insertion or deletion). A node ID may be implemented by the update component. The node ID corresponds to the metadata entries to identify the origin node. It is contemplated that an update comprises both types of metadata changes an insertion change and a deletion change. In cases where an insertion and deletion correspond to the same chunk appearing in the same metadata sync interval, the insertion and deletion can be ignored. Chunks of data can be downloaded once by a single node where each chunk has only one insertion and at most one deletion.

A maintenance component 386 is responsible for managing maintenance of in-memory table. The maintenance component 386 facilitates performing one or more maintenance operations on the in-memory table. In particular, maintenance operations performed by the maintenance component can be initiated based on identifying particular maintenance triggers. Maintenance triggers can include local metadata changes, messages from peers (e.g., periodic sync messages, response messages to startup pulling requests, NAK (negative acknowledgment) received when the download controller 324 tries to download a chunk from a peer. The maintenance component 386 can further be responsible for applying metadata entries. For example, a metadata entry can be applied into the in-memory table when the same or a newer version of the memory does not exist in the in-memory table. The applicable metadata entry, except those returned for pulling request can be sent to message a sender component and later peers for period synchronization. Metadata entries about NAK can also be forwarded to communicate for the information available therein. When a metadata entry is not applicable, the download controller 324 can drop the metadata entry. A node will send out a metadata entry at most once.

Figure 6:
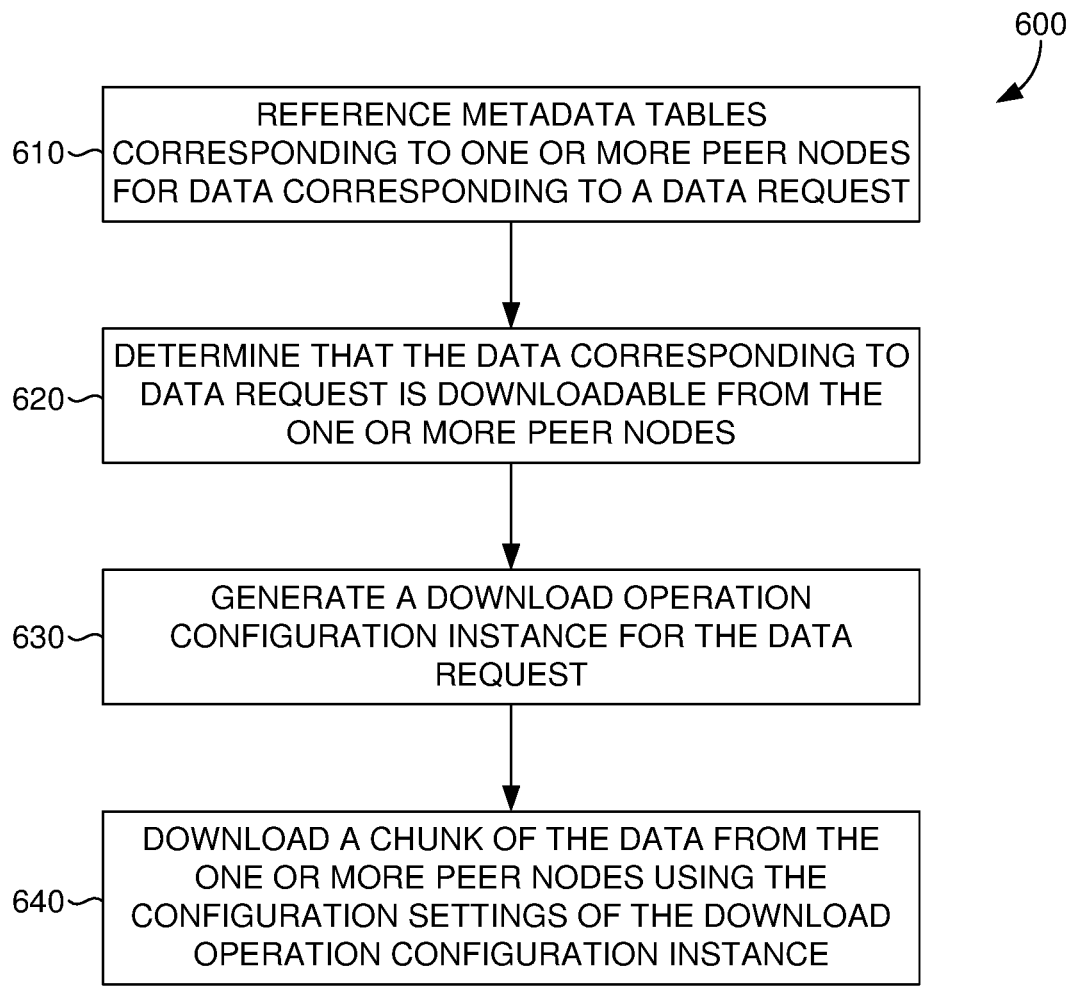
FIG. 6 is a flow diagram showing an exemplary method for enhanced access to storage data in distributed storage systems, in accordance with embodiments described herein.

Turning now to FIG. 6, a flow diagram is provided that illustrates a method 600 for enhanced access to data in distributed storage systems. Initially at block 610, metadata tables in one or more peer nodes, is referenced by a requesting node for data in a corresponding data request. The metadata tables indicate availability of chunks of data in the one or more peer nodes. At block 620, a determination that the data corresponding to data request is downloadable from the one or more peer nodes is made based on the metadata tables. At block 630, a download operation configuration instance for the data request is generated. The download instance includes configuration settings for downloading the data corresponding to the data request. At block 640, a chunk of data is downloaded from the one or more peer nodes using the configuration settings of the download operation configuration instance.

Figure 7:
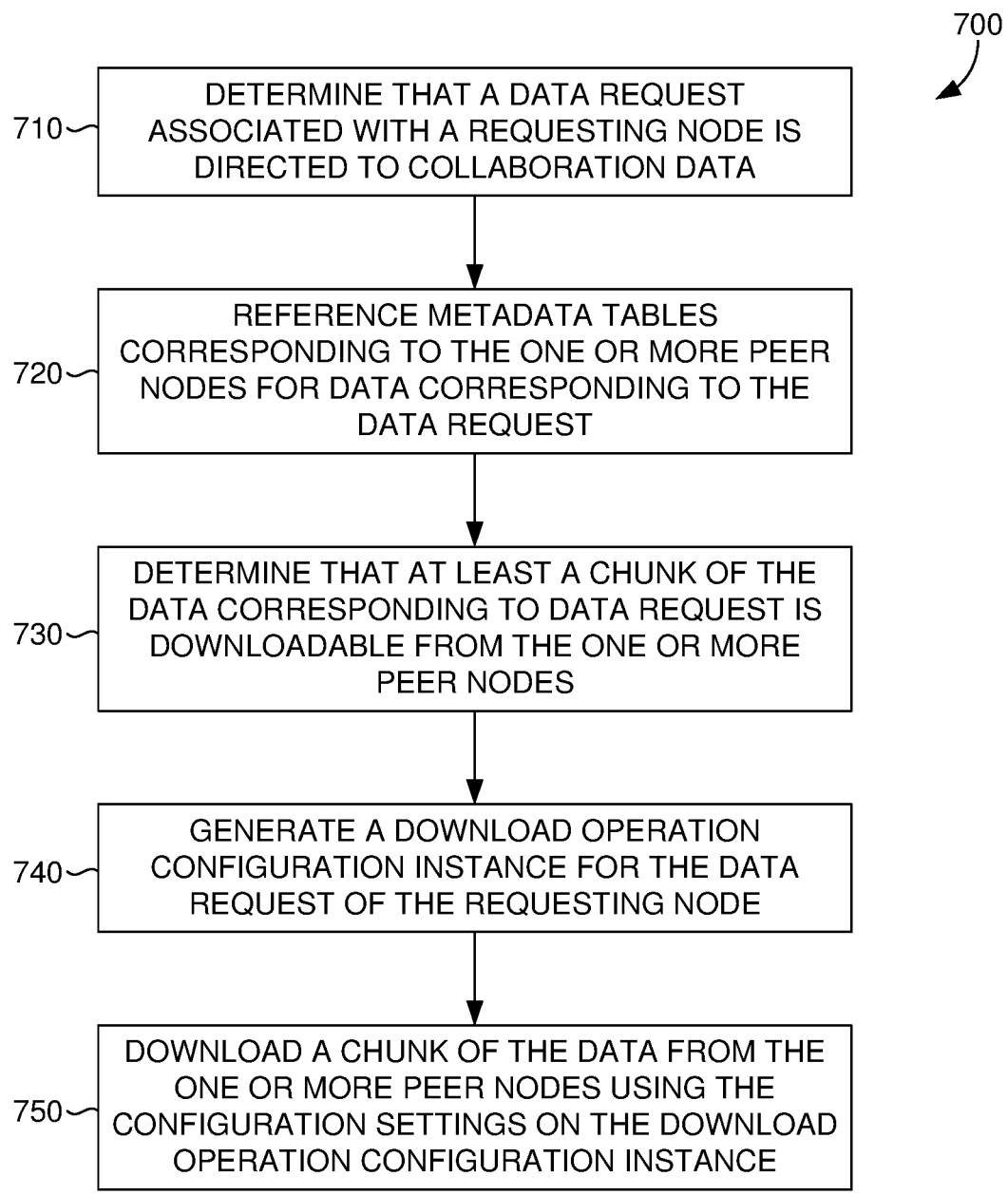
FIG. 7 is a flow diagram showing an exemplary method for enhanced access to storage data in distributed storage systems, in accordance with embodiments described herein.

Turning now to FIG. 7, a flow diagram is provided that illustrates a method 700 for enhanced access to storage data in a distributed storage system. At block 710, a determination that a data request, associated with a requesting node, is directed to collaboration data is made. Collaboration data comprises data that is stored on at least one of: a cloud computing platform storage or one or more peer nodes in a collaboration proxy system. At block 720, metadata tables in the one or more peer nodes for data corresponding to the data request are referenced. Referencing the metadata tables corresponding to the one or more peer nodes is based on an established communication channel with the one or more peer nodes. At block 730, a determination is made that at least a chunk of the data corresponding to data request is downloadable from the one or more peer nodes. The determination is based on the metadata tables. At block 740, a download operation configuration instance for the data request of the requesting node is generated. The download operation instance comprises configuration settings for downloading data corresponding to the data request from the one or more nodes. At block 750, the chunk of the data from the one or more peer nodes is downloaded using the configuration settings on the download operation configuration instance, where downloading the chunk of data is based on a long-tail mitigation routine.

Figure 8:
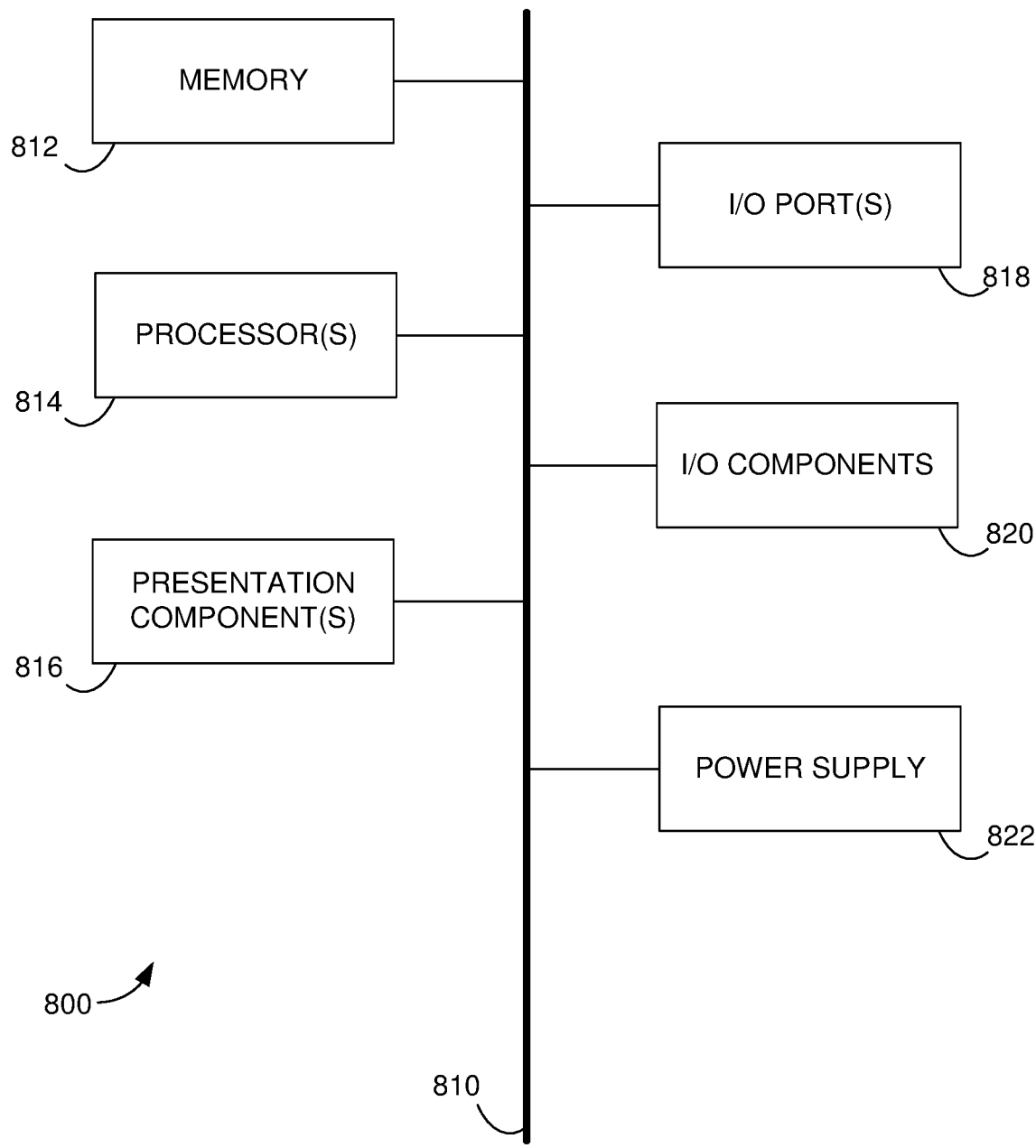
FIG. 8 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for managing duplicate copies of data, the system comprising:
   a first node comprising one or more hardware processors and memory storing computer program instructions, the memory configured to provide the computer program instructions to the one or more hardware processors;
   a data proxy component of the first node configured to:
   receive a request from a requesting second node for a data download comprising a plurality of data chunks in storage of a distributed computing platform, the data chunks cached as corresponding duplicated data chunks on a plurality of nodes in a peer group comprising the first node and the requesting node;
   determine, using a metadata table stored in the memory, that a first duplicated data chunk of the duplicated data chunks is available from a peer node of the plurality of nodes in the peer group; and
   download, based on determining that the first duplicated data chunk is available from the peer node, the first duplicated data chunk from the peer node; and
   a cache manager of the first node configurable to cache the first duplicated data chunk in a cache of the memory in accordance with a first in-memory cache mode setting specifying an eviction policy for the cache, wherein the first in-memory cache mode setting specifies that the eviction policy includes evicting cached data chunks determined to be most globally available across the plurality of nodes in the peer group.

2. The system of claim 1, wherein the cache manager is configurable to cache the first duplicated data chunk in accordance with a second in-memory cache mode setting specifying the eviction policy for the cache, wherein the second in-memory cache mode setting configures the cache manager to: track usage of cached duplicated data chunks in the cache of the first node, the usage including when the cached duplicated data chunks were last written to the cache and when the cached duplicated data chunks were last served to one of the peer nodes; and evict ones of the cached duplicated data chunks determined to be least recently used by the first node.

3. The system of claim 1, wherein the cache manager is configurable to cache the first duplicated data chunk in accordance with a second in-memory cache mode setting specifying the eviction policy for the cache, wherein the second in-memory cache mode setting configures the cache manager to: track a frequency that cached duplicated data chunks in the cache of the first node are accessed by one of the peer nodes; and evict ones of the cached duplicated data chunks determined to be least frequently accessed from the first node.

4. The system of claim 1, wherein the cache manager is configurable to cache the first duplicated data chunk in accordance with a second in-memory cache mode setting specifying the eviction policy for the cache, wherein the second in-memory cache mode setting configures the cache manager to: track an order that cached duplicated data chunks in the cache of the first node are added to the cache; and evict ones of the cached duplicated data chunks determined to be added to the cache of the first node earliest.

5. The system of claim 1, wherein the cache manager is configurable to cache the first duplicated data chunk in accordance with a second in-memory cache mode setting specifying the eviction policy for the cache, wherein the second in-memory cache mode setting configures the cache manager to evict random cached duplicated data chunks from the cache of the first node.

6. The system of claim 1, wherein the cache manager is configured to utilize a single thread for read and write operations.

7. A computer-implemented method for managing data duplicates in distributed storage systems, the method comprising:
   receiving, at a first node, a request from a requesting second node for a data download comprising a plurality of data chunks in storage of a distributed computing platform, the data chunks cached as corresponding duplicated data chunks on a plurality of nodes in a peer group comprising the first node and the requesting node;
   determining, by the first node and using a metadata table stored in memory of the first node, that a first duplicated data chunk of the duplicated data chunks is available from a peer node of the plurality of nodes in the peer group;
   downloading, by the first node and based on determining that the first duplicated data chunk is available from the peer node, the first duplicated data chunk from the peer node; and
   caching the first duplicated data chunk in a cache of the memory of the first node in accordance with a configurable cache strategy specifying an eviction policy for the cache.

8. The method of claim 7, further comprising tracking availability of cached duplicated data chunks on the plurality of nodes, wherein the configurable cache strategy specifies that the eviction policy includes evicting, from cache of the first node, ones of the cached duplicated data chunks determined to be most globally available across the plurality of nodes in the peer group.

9. The method of claim 7, further comprising tracking usage of cached duplicated data chunks in the cache of the first node, the usage including when the cached duplicated data chunks were last written to the cache and when the cached duplicated data chunks were last served to one of the peer nodes, wherein the configurable cache strategy specifies that the eviction policy includes evicting ones of the cached duplicated data chunks determined to be least recently used by the first node.

10. The method of claim 7, further comprising tracking a frequency that cached duplicated data chunks in the cache of the first node are accessed by one of the peer nodes, wherein the configurable cache strategy specifies that the eviction policy includes evicting ones of the cached duplicated data chunks determined to be least frequently accessed from the first node.

11. The method of claim 7, further comprising tracking an order that cached duplicated data chunks in the cache of the first node are added to the cache, wherein the configurable cache strategy specifies that the eviction policy includes evicting ones of the cached duplicated data chunks determined to be added to the cache of the first node earliest.

12. The method of claim 7, wherein the configurable cache strategy specifies that the eviction policy includes evicting random cached duplicated data chunks from the cache of the first node.

13. The method of claim 7, wherein the caching utilizes a single thread for read and write operations.

14. One or more computer storage media having computer-executable instructions embodied thereon that, when executed, by one or more processors associated with a first node, causes the one or more processors to perform a method for managing data duplicates in distributed storage systems, the method comprising:
receiving, at the first node, a request from a requesting second node for a data download comprising a plurality of data chunks in storage of a distributed computing platform, the data chunks cached as corresponding duplicated data chunks on a plurality of nodes in a peer group comprising the first node and the requesting node;
determining using a metadata table stored in memory of the first node, that a first duplicated data chunk of the duplicated data chunks is available from a peer node of the plurality of nodes in the peer group;
generating a configuration instance for the request, the configuration instance specifying configuration settings comprising download settings and an in-memory cache mode setting specifying an eviction policy for a cache of the memory of the first node;
downloading, based on determining that the first duplicated data chunk is available from the peer node, the first duplicated data chunk from the peer node in accordance with the download settings; and
caching the first duplicated data chunk in the cache using the eviction policy for the cache.

15. The computer storage media of claim 14, the operations further comprising tracking availability of cached duplicated data chunks on the plurality of nodes by tracking, wherein the in-memory cache mode setting specifies that the eviction policy includes evicting, from cache of the first node, ones of the cached duplicated data chunks determined to be most globally available across the plurality of nodes in the peer group.

16. The computer storage media of claim 14, the operations further comprising tracking usage of cached duplicated data chunks in the cache of the first node, the usage including when the cached duplicated data chunks were last written to the cache and when the cached duplicated data chunks were last served to one of the peer nodes, wherein the in-memory cache mode setting specifies that the eviction policy includes evicting ones of the cached duplicated data chunks determined to be least recently used by the first node.

17. The computer storage media of claim 14, the operations further comprising tracking a frequency that cached duplicated data chunks in the cache of the first node are accessed by one of the peer nodes, wherein the in-memory cache mode setting specifies that the eviction policy includes evicting ones of the cached duplicated data chunks determined to be least frequently accessed from the first node.

18. The computer storage media of claim 14, the operations further comprising tracking an order that cached duplicated data chunks in the cache of the first node are added to the cache, wherein the in-memory cache mode setting specifies that the eviction policy includes evicting ones of the cached duplicated data chunks determined to be added to the cache of the first node earliest.

19. The computer storage media of claim 14 wherein the in-memory cache mode setting specifies that the eviction policy includes evicting random cached duplicated data chunks from the cache of the first node.

20. The computer storage media of claim 14, wherein the caching comprises utilizing a single thread for read and write operations.

* * * * *